United States Patent [19]
Hunyar

[11] 3,954,363
[45] May 4, 1976

[54] CONTROL CIRCUIT FOR PHONOGRAPH RECORD PRESSING DIE APPARATUS

[75] Inventor: Csaba K. Hunyar, Sunland, Calif.

[73] Assignee: United Artists Music and Records Group, Inc., Los Angeles, Calif.

[22] Filed: May 8, 1974

[21] Appl. No.: 467,873

[52] U.S. Cl. .............................. 425/157; 425/116; 425/123; 425/135; 425/155; 425/160; 425/810
[51] Int. Cl.² .......................................... B29D 17/00
[58] Field of Search ........... 425/112, 116, 123, 137, 425/501, 511, 810, 107, 308, 157, 160, 155

[56] References Cited
UNITED STATES PATENTS

| | | | |
|---|---|---|---|
| 2,743,478 | 5/1956 | Harlow et al. .................. | 425/511 X |
| 3,113,905 | 12/1963 | Rosen ............................ | 425/810 X |
| 3,186,029 | 6/1965 | Joseph ............................ | 425/123 |
| 3,329,997 | 7/1967 | Rand et al. ..................... | 425/112 |
| 3,412,427 | 11/1968 | Flusfeder et al. .............. | 425/511 |
| 3,514,813 | 6/1970 | Westermann .................. | 425/501 |
| 3,526,690 | 9/1970 | Bachman ....................... | 425/135 X |
| 3,528,127 | 9/1970 | Domm et al. .................. | 425/116 |
| 3,635,622 | 1/1972 | Wechsler ....................... | 425/116 |
| 3,642,401 | 2/1972 | Wilson .......................... | 425/137 |
| 3,663,136 | 5/1972 | Westermann .................. | 425/116 |

Primary Examiner—J. Howard Flint, Jr.
Attorney, Agent, or Firm—William W. Haefliger

[57] ABSTRACT

Control circuitry for record pressing equipment is provided, and is characterized by ease of shifting between automatic and manual operational modes, and at any stage, as well as by simplicity and ease of operation. The flow control of cooling a heating fluid for the die means is integrated with the control circuitry.

10 Claims, 9 Drawing Figures

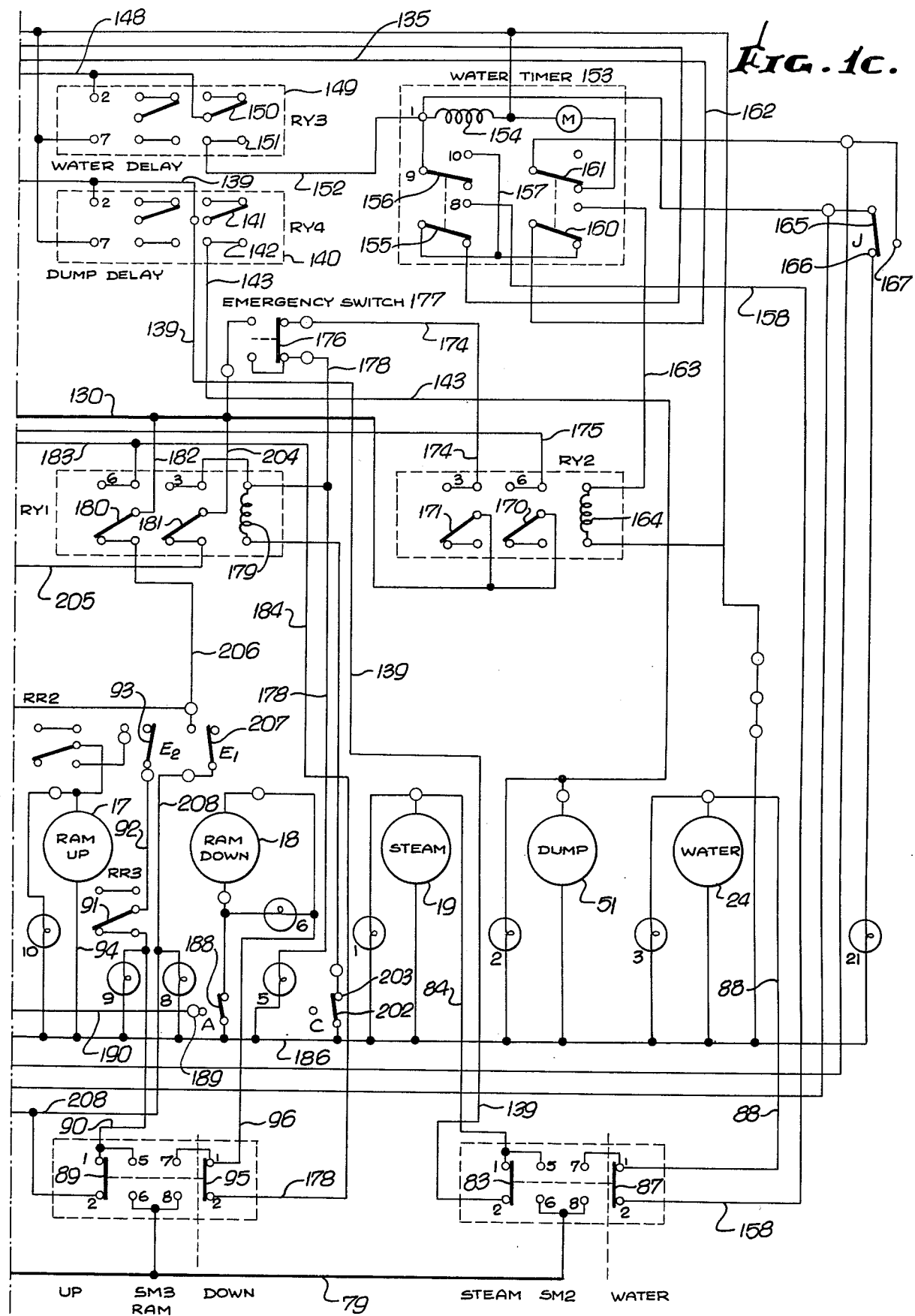

3,954,363

CONTROL CIRCUIT FOR PHONOGRAPH RECORD PRESSING DIE APPARATUS

BACKGROUND OF THE INVENTION

This invention relates to the control of phonograph record pressing equipment, and more specifically concerns circuitry to achieve such control.

In the past, circuitry to control phonograph record pressing equipment has been unduly complex, making difficult the effective control, repair and adjustment of such equipment.

SUMMARY OF THE INVENTION

It is major object of the invention to provide relatively simple and easily operated control circuitry for record pressing equipment, and which may be easily shifted between automatic and manual operational modes, and at any stage; also, the operation of fluid cooling and heating control equipment for the die member or members is integrated with such controls, as will be seen.

Basically, there are provided first circuit means to control other means which supplies a resin blank to the opened die means, closes and opens the die, removes the record and processes same; second circuit means to control heating and cooling fluid flow control means in timed relation to the automatic opening and closing of the die means, and to control the first circuit means; and third circuit means, including manually operable switches to control said other means, thereby to independently control resin blank supply, die opening and closing, and removal and processing of the record; and a mode control switch to enable one or the other of the first and third circuit means. As will appear, the second circuit means may include steam flow and water flow controls, the operation of one of which controls the first circuit means.

Further, manual switches and indicator lights are provided at a control panel to enable the operator to manually control the equipment in proper sequence as related to the stage of automatic control achieved prior to manual control take-over.

In addition various multiple safety switches are provided, as will be described, to facilitate safe, non-jamming and non-destructive operation of the equipment in either manual or automatic mode.

These and other objects and advantages of the invention, as well as the details of an illustrative embodiment, will be more fully understood from the following description and drawings, in which:

DRAWING DESCRIPTION

FIGS. 1a to 1c define an electrical diagram;

DETAILED DESCRIPTION

Description of the invention, which primarily resides in the circuitry, along with associated apparatus will proceed in stages, as follows:

GENERAL DESCRIPTION OF APPARATUS

Figure 1A:
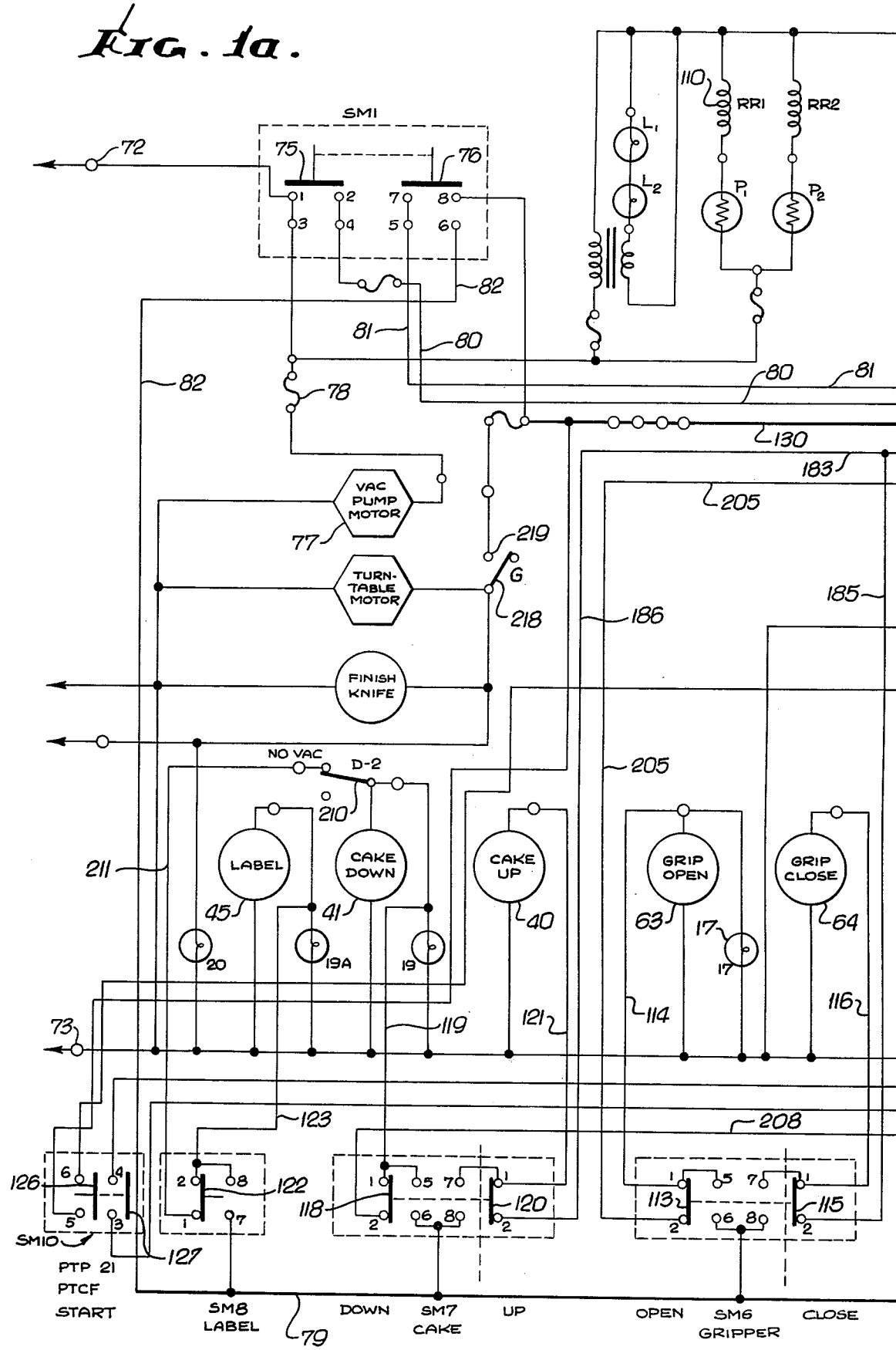
Figure 1B:
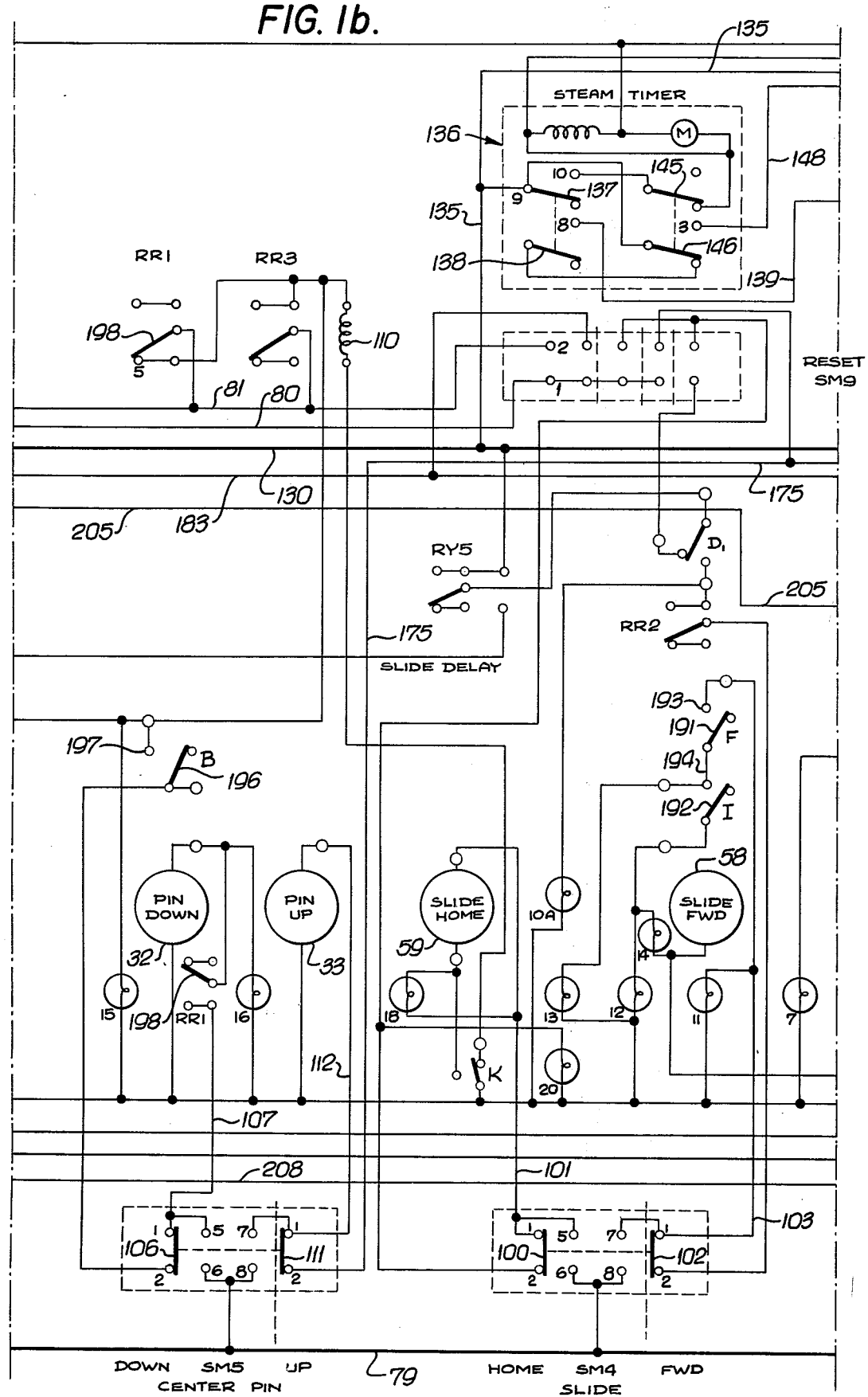
Figure 2:
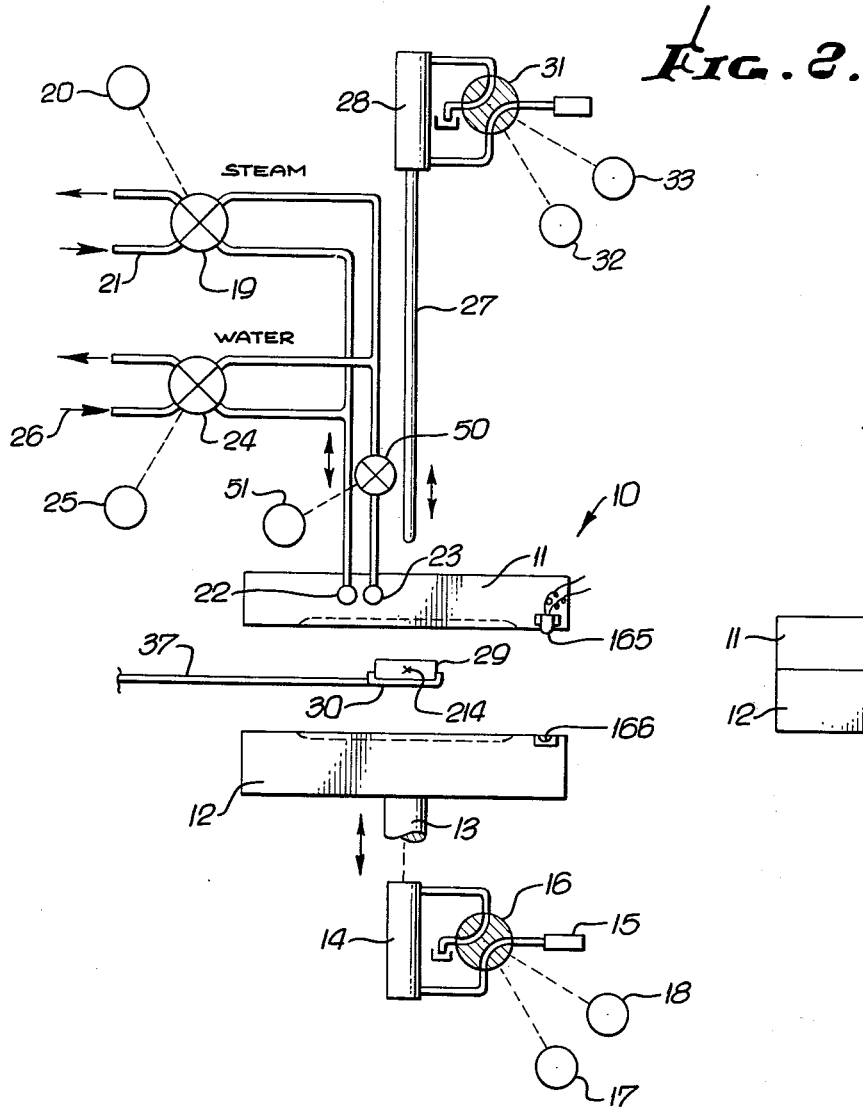
FIG. 2 is a side elevation schematically showing record pressing die means in open condition, and along with fluid heating and cooling equipment.
Figure 3:
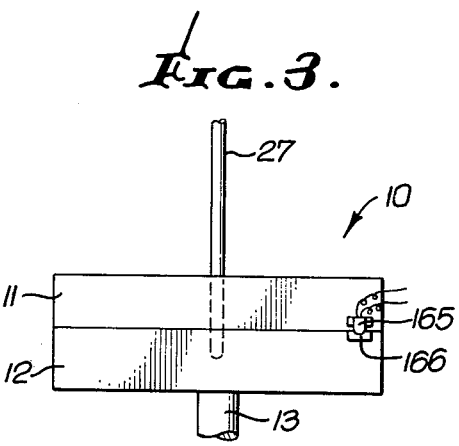
FIG. 3 is a view like FIG. 2 showing the die means in closed condition.

Referring to FIGS. 2 and 3, record pressing die means 10 includes a fixed position upper die member 11, and a vertically reciprocable lower die member 12. The latter is movable between lower position (in which the die means is open) in FIG. 2, to raised position (in which the die means is closed) in FIG. 3. The ram 13 to raise and lower the member 12 is actuated by fluid actuator 14 to which fluid is transferred from a source 15 via a four-way valve 16. An "UP" solenoid 17 displaces the valve in one direction to supply fluid from source 15 to the actuator to raise the ram, and a "DOWN" solenoid 18 displaces the valve in the opposite direction to supply fluid from source 15 to the actuator to lower the ram. These solenoids also appear in FIG. 1.

FIG. 2 also shows a two-way valve 19 controlled by solenoid 20 to move between OPEN position, in which steam is supplied from a source 21 to circulate within member 11 via inlet and outlet ports 22 and 23 and return via valve 19 to exhaust; and CLOSED position, in which steam supply to member 11 is shut off. Another two-way valve 24 is controlled by solenoid 25 to move between OPEN POSITION, in which cooling water is supplied from a source 26 to circulate within member 11 via inlet and outlet ports 22 and 23, and return via valve 24 to exhaust; and CLOSED position, in which water supply to member 11 is shut off. A dump valve 50, when closed, blocks fluid exit from the exit port 23, and a solenoid 51 controls opening and closing of that valve.

In addition, a pin member 27 is controlled by fluid such as air operated actuator 28 to move between up or retracted position as shown, and a down position in which it centrally penetrates a record cake or blank 29 to keep it in position while the blank holder 30 is removed from between the open die members. Note the down position of the pin seen in FIG. 3. A four-way valve 31 controls fluid flow to the actuator, and solenoids 32 and 33 respectively displace the valve to pin up and pin down positions. Such solenoids also appear in FIG. 1.

Figure 6:
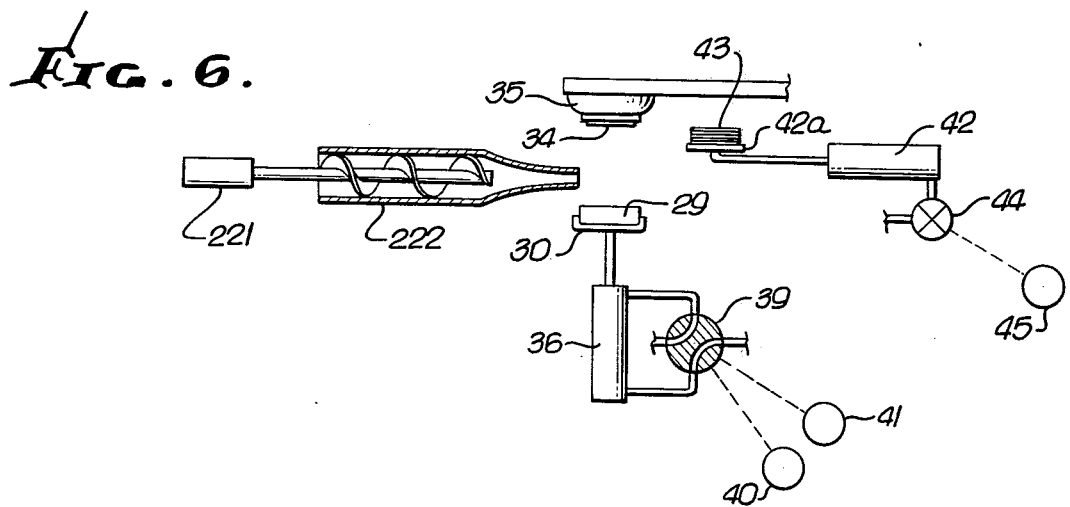
FIG. 6 is a schematic side elevation of cake or blank supply means, and labeling means.
Figure 5:
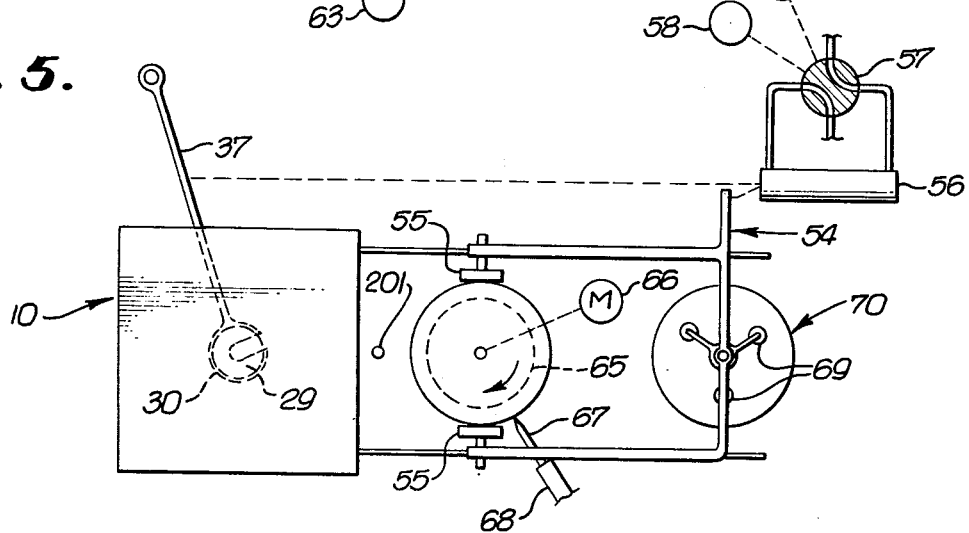
FIG. 5 is a view like FIG. 4 showing the position of the elements in another position of the slide.

FIG. 6 shows the cake or blank holder 30 removed or retracted from between the die members, and in a DOWN position to receive the cake 29. An actuator 36 controls movement of the holder between DOWN position and UP position in which the cake is lifted to engage a label 34 held by suction against suction cup 35. After the label adheres to the cake, the latter is lowered to DOWN position, by actuator 36 connected with holder 30, so as to be displaced by arm 37 between the die members, as seen in FIGS. 2 and 5. A four-way valve 39 controls fluid flow to the actuator, and solenoids 40 and 41 respectively displace the valve to cake UP and DOWN positions, such solenoids also appear in FIG. 1. An actuator 42 connected with label holder 42a advances a stack 43 of labels to a position beneath cup 35 so that the top label may be suction attached to the cup, after which the actuator retracts the label stack to the position shown. A valve 44, controlled by solenoid 45, controls the fluid flow to the actuator, and a return spring may retract the actuator plunger. Solenoid 45 appears in FIG. 1.

Figure 4:
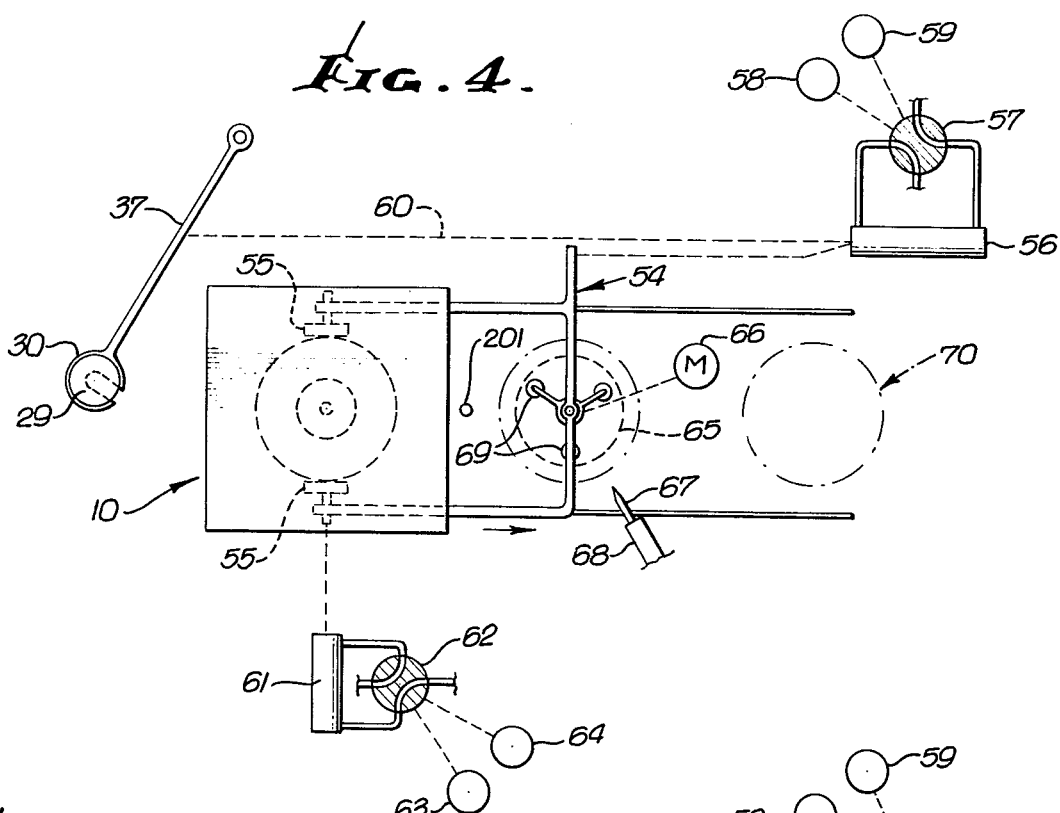
FIG. 4 is a schematic plan view of the pressing die means, a reciprocating slide, a gripper and record cake or blank holder, in one position of the slide.

A slide mechanism 54 carrying record grippers 55 is movable between IN or FORWARD position as seen in FIG. 4, and OUT or HOME position seen in FIG. 5. Actuator 56 controls such movement, and is in turn controlled by four-way valve 57. Solenoids 58 and 59 respectively rotate the valve between slide FORWARD and HOME position, and are seen in FIG. 1. Movement of the slide also actuates the arm 37 for the cake holder 30, and for that purpose the actuator 56 may also be used to operate arm 37 as indicated by link 60. Grippers 55 may be operated between record edge gripping CLOSED position, and OPEN position, as by actuators 61. The latter are controlled by valves 62 which are in turned controlled by CLOSE and OPEN solenoids 63 and 64, also seen in FIG. 1. The grippers grip opposite flash edges of the pressed record when the slide moves to FORWARD position, so as to remove the record from between the die members when the slide is moved to OUT from HOME position. At the latter position, the grippers release the record to be supported and turned by a turntable 65 rotated by motor 66. In that position, a finish knife 67 is advanced by solenoid 68 to finish cut the record edge, removing the flash, as the record turns. Subsequently, when the slide is in HOME position, a set of vacuum cups 69 grip the center of the record on the turntable, to transport the record to a stack position indicated at 70 when the slide moves to FORWARD position. At that point, he vacuum cups 69 release the record, for stacking.

In FIG. 1, supply current input and output terminals appear at 72 and 73. Such current is supplied to vacuum pump motor 77 via fuse 78. When both movable contacts 75 and 76 of main switch SM1 are closed to connect fixed contacts 3 and 4, and 5 and 6 of the switch, the circuitry is in MANUAL mode, current then being supplied to bus 79 at the bottom of the diagram via lead 80, contacts 1 and 2 of RESET switch SM9, lead 81, and lead 82.

In MANUAL mode, each of switches SM2, SM3, SM4, SM5, SM6, SM7 and SM8 may be manually independently operated, according to the following table, current flowing to the indicated solenoids, to return line 86, and outlet terminal 73.

TABLE I

| switch | contact affected | function |
|---|---|---|
| SM2 (STEAM & WATER) | movable contact 83 displaced to engage fixed contact 5 and 6 (normally, contact 83 engages automatic mode contacts 1 and 2 as shown) | power applied via lead 84 to steam valve solenoid 19, and also to panel light (1) |
| | movable contact 87 displaced to engage fixed contacts 7 and 8 (normally, contact 87 engages automatic mode contacts 1 and 2 as shown) | power applied via lead 88 to water valve solenoid 24, and also to panel light (3) |
| SM3 (RAM) | movable contact 89 displaced to engage fixed contacts 5 and 6 (normally, contact 89 engages actuator mode contacts 1 and 2 as shown) | power applied via lead 90, contact 91 of relay RR3, lead 92, SPDT switch E2, contact 93 of relay RR2, and lead 94 to ram UP solenoid 17, and also to panel lights (9) and (10). Safety switch E2 is closed when the slide 54 is in completely home position, failing which the ram cannot rise up. |
| | movable contact 95 displaced to engage fixed contacts 7 and 8 (normally, contact 95 engages automatic mode contacts 1 and 2 as shown) | power applied via lead 96 to ram DOWN valve solenoid 18, and also to panel light (6) |
| SM4 (SLIDE) | movable contact 100 displaced to engage fixed contacts 5 and 6 (normally, contact 100 engages automatic mode contacts 1 and 2 as shown) | power applied via lead 101 to slide HOME valve solenoid 59, and also to panel light (18), provided switch K is closed. Switch K is closed by the gripper arm when the grippers are CLOSED, sending the slide HOME. |
| | movable contact 102 displaced to engage fixed contacts 7 and 8 (normally, contact 102 engages automatic mode contacts 1 and | power applied via lead 103 and switches F and I to slide FORWARD valve solenoid 58, and also to panel |

TABLE I-continued

| switch | contact affected | function |
|---|---|---|
| | 2 as shown) | lights (11) (12) and (14). Switch F is located at the bottom of the label stack 43 in FIG. 6, in order to close when the label holder returns to retracted position. Switch I, at the top of the cake cup, indicates whether or not the cake cup is open. |
| SM5 (CENTER PIN) | movable contact 106 displaced | power applied via |
| | to engage fixed contacts 5 and 6 (normally, contact 106 engages automatic mode contacts 1 and 2 as shown) | lead 107 and RR1 to pin DOWN valve solenoid 32, and also panel light (16). Arm 198 of relay RR1 is maintained in UP position, or OPEN, to prevent the down movement of the PIN, when the die members are not closed (unbroken light beam of photocell P1 causes current energization of relay coil 110) and vice versa. |
| | movable contact 111 displaced to engage fixed contacts 7 and 8 (normally, contact 111 engages automatic mode contacts 1 and 2, as shown) | power applied via lead 112 to pin UP valve solenoid 33. |
| SM6 (GRIPPER) | movable contact 113 displaced | power applied via |
| | to engage fixed contacts 5 and 6 (normally, contact 113 engages automatic mode contacts 1 and 2, as shown) | lead 114 to gripper OPEN valve solenoid 63, and also to panel light (17) |
| | movable contact 115 displaced to engage fixed contacts 7 and 8 (normally, contact 115 engages automatic mode contacts 1 and 2, as shown) | power applied via lead 116 to gripper CLOSE valve solenoid 64. |
| SM7 (CAKE) | movable contact 118 displaced | power applied via |
| | to engage fixed contacts 6 and 7 (normally, contact 118 engages automatic mode contacts 1 and 2, as shown) | lead 119 to cake DOWN solenoid 41, and also to panel light (19). |
| | movable contact 120 displaced to engage fixed contacts 7 and 8 (normally, contact 120 engages automatic mode contacts 7 and 8, as shown) | power applied via lead 121 to cake (UP) solenoid 40. |
| SM8 (LABEL) | movable contact 122 displaced | power applied via |
| | to engage fixed contacts 7 and 8 (normally, contact 122 engages automatic mode contacts 1 and 2, as shown) | lead 123 to label solenoid 45 and to panel light (19A) |
| SM9 | reset switch | when applied in manual mode, SM9 resets most mechanical motions to START, and will also allow the automatic cycle to start from the beginning when SM1 is moved to automatic mode. |

AUTOMATIC OPERATION

When manual start switch SM10 is momentarily closed (movable contacts 126 and 127 displaced to respectively engage fixed contacts 5 and 6, and 3 and 4), automatic operation is commenced, provided main switch SM1 contacts 75 and 76 are moved to respectively engage fixed contacts 1 and 2, and 7 and 8 of SM1. Current is then supplied to bus 130.

Current is then supplied from bus 130 and via lead 135 to terminal 9 of steam timer 136. The steam timer then starts to run; movable contacts 137 and 138 are then moved to engage timer terminals 10 and 8, respectively. Current then flows via contacts 137 and 145 to motor M, starting the steam timer. Current is also supplied via contact 138, path 139 and lead 84 to the steam valve solenoid 19, moving the steam valve to OPEN position and passing steam to the die. Also, current supplied via line 139 to terminal 2 of the DUMP DELAY 140 passes to terminal 7 via an appropriate delay coil, which magnetically shifts contact arm 141 down to engage contact 142, whereby current is then supplied via leads 139 and 143 to DUMP solenoid valve 51, closing valve 50 after the delay interval. This provides a faster steam heating of the upper die member 11.

When the steam timer motor M runs out, contact arms 137 and 138 return to the positions shown, and contact arms 145 and 146 move upward, with arm 146 engaging fixed contact 3. Accordingly, the steam solenoid 19 is deactivated and the steam valve 19 closes, the dump solenoid 51 is deactivated and the dump valve 50 opens, and the DUMP DELAY re-sets (contact 141 moves to up-position shown). Also, current flows via path 148 to terminal 2 of the WATER DELAY 149, and passes to terminal 7 of the latter via an appropriate delay coil; the latter after an appropriate interval magnetically shifts arm 150 to engage contact 151, whereby current is then supplied via path 152 to terminals 1 and 9 of the WATER TIMER 153. The delay interval corresponds to a small delay between cessation of steam supply and initiation of water supply, to the die 11, resulting in a boost in die temperature.

Supply of current to the WATER TIME energizes coil 154 causing movable contacts 155 and 156 to shift into engagement with contacts 10 and 8, respectively. Accordingly, current is supplied via arm 156, path 157, arm 155, path 158 and lead 88 to the water valve solenoid 24, opening the water valve 24, and allowing cooling water to run through die 11. When the water timer runs out, contacts 155 and 156 will return to the positions shown, and contacts 160 and 161 will move up, whereby current is then supplied via path 135, 162, arm contact 160, and path 163 to coil 164 of relay RY2, starting the automatic mechanical motion cycle. Notice that the water timer will be prevented from operating if the J switch is not closed, i.e. contact arm 165 engaged with terminal 166, i.e. off terminal 167 (which shorts current around coil 154). The J switch is located between die elements 11 and 12, as seen in FIG. 2, and will close when the dies close together; thus, it will prevent operation of the water timer if the press did not close completely. Energization of coil 164 of relay RY2 (when the water tuner times out) shifts movable contacts 170 and 171 into engagement with fixed contacts 6 and 3 of RY2. Accordingly, power is then supplied from bus 130 to leads 174 and 175. From lead 174, current flows via movable contact 176 of STOP emergency switch 177 to lead 178, and through coil 179 of relay RY1 and then to outlet bus 86. RY1 thus latches, movable contacts 180 and 181 engaging fixed contacts 6 and 3 of RY1. Accordingly, power is supplied via bus 130, lead 182, contact 180 to bus 183, causing the ram to move DOWN (opening the die), closes the grippers, and brings the cake up, with reference to FIGS. 2, 4 and 6. See in this regard, current path 184 from bus 183 to SM3 contact 95, and path 96 to RAM DOWN solenoid 18; current path 185, from bus 183 to SM6 contact 115, and path 116 to gripper CLOSE solenoid 64; and current path 186 from bus 183 to SM7 contact 120, and path 121 to cake UP solenoid 40. From lead 175, current flows to SM5 switch contact 111, and via path 112 to center pin UP solenoid 33, for raising the center pin 27 as seen in FIG. 2.

As the die lower member 12 bottoms out, it operates switch A, by moving contact 188 to engage fixed contact 189, thereby completing the slide FORWARD circuit path 190. The slide will then move FORWARD, provided the F and I switches are "made", i.e. contacts 191 and 192 respectively engage fixed contacts 193 and 194. In this regard, F switch is made if the label holder 42a has been completely retracted out from under the suction cup 35. The I switch is made if cake cup is completely open.

As the slide moves forward, the B switch is made, i.e. movable contact 196 is moved by the slide into engagement with fixed contact 197. This completes the pin DOWN solenoid circuit, sending the center pin down, if relay RR1 has been actuated to close movable contact 198 thereof against fixed contact 5 of RR1. Such actuation of RR1 occurs if coil 110 thereof remains energized. In this regard, photocell P1 controls energization of coil 110; thus, when the completely pressed record is moved by the grippers on the slide from between die members 11 and 12 to the flash cutter turntable 65, the transfer of the record momentarily blocks the photocell beam whose axis is seen at 201 in FIG. 4 as vertical to the plane of FIG. 4. If such momentary interruption does not occur, it means that the record remains in the press and not transferred by the grippers. The unbroken beam then prevents energization of coil 110, and prevents lowering of pin 27. Light sources for photocells P1 and P2 appear at L1 and L2.

As the center pin comes DOWN, a collar on the pin trips the C switch, opening movable contact 202 away from fixed contact 203, which de-energizes coil 179 in relay RY1, which in turn effects opening of the grippers; i.e. current flows to grip OPEN solenoid 63 via bus 130, lead 204, contact arm 181, lead 205 and lead 114. The gripper actuator arm, which opens the grippers, then closes the K switch, which completes the slide HOME solenoid circuit, and sends the slide HOME. (The grippers are closed by the closing operation of the press.)

When the slide arrives HOME, both switches E1 and E2 make. Current than flows via path 206, E1 switch arm 207, path 208, SM7 contact 118 and lead 119 to cake DOWN solenoid 41, to send the cake holder down. If arm 210 of vacuum switch D2 is in "no vacuum" position, current will be supplied via path 119, arm 210, path 211, SM8 contact 122 and lead 123 to the label solenoid 45. The latter effects displacement of the label holder 42a and stack 43 to move the stack to top label pick-up position as respects suction cup 35. If the label is successfully picked up, vacuum will build up in the vacuum system associated with cup 35, switch D2 opens (arm 210 moves off terminal 213, and the label feeding operation stops. Switch E1 also operates as a safety for the ram UP displacement. Thus, when E1 and E2 are both made, they should send the ram up, if relay RR3 was not actuated (no record was dragged back into the press by the grippers, etc.), and if RR2 relay is closed (there is cake in the die pressing space). In this regard, RR2 is associated with photocell P2, whose beam traverses the space between the die members when they are open (see beam axis 214 vertical to the plane of FIG. 2). Thus, the beam determine whether or not a plastic cake was delivered into the die; if the beam is not blocked by the cake (indicating absence of the cake), P2 connected to RR2 will prevent UP travel of the ram and die member 12. When the press is opened, and if the record was dropped by one of the grippers, the beam of P2 will be blocked, and RR2 will not allow the slide to go FORWARD, and will stop the press.

The cycle is completed as the ram travels Up and after pressing of a new record, a new cycle will start when RR2 is actuated.

When the cake comes down, G switch is made, contact 218 closing against contact 219. This will turn ON the turntable motor 66, energize solenoid 68 to advance trim knife 67, and also the drive 221 for extruder 222. When the extruder completes its operation to fill the holder 30 with plastic cake 29, the latter is moved toward breaking G switch, stopping the turntable motor, retracting knife 67, and stopping the extruder drive 220.

Figure 7:
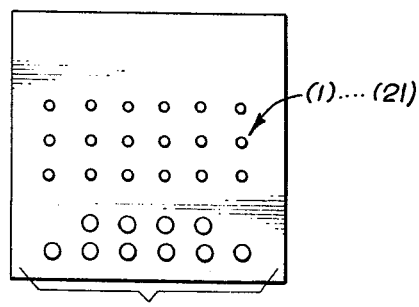
FIG. 7 is an elevation showing the front panel of a control box.

All switches SM1–SM10, and all indicator lights (1)–(20) are located on a front panel at a control box, as seen in FIG. 7. Thus, the operator knows at all times the stage to which automatic operation has proceeded; also he can easily carry out manual control as may be needed during servicing, repair and in case of possible malfunction. If manual operation is desired at any stage, SM1 is operated, as described, and the operator will know which of the switches SM2–SM10 to manually operate, since the light associated with the function solenoid just previously operated will be ON. As described, the fluid cooling and heating mechanism will also be disabled by SM1 by conversion to manual mode.

I claim:

1. In phonograph record pressing apparatus incorporating pressing die means movable between open and closed positions, flow control actuator and valve means to control flow of heating and cooling fluid to the die means, and other means including fluid responsive actuators and fluid pressure control valves to supply a plastic blank to the opened die means, to close the die means for pressing the blank into a record and thereafter to open the die means, to remove the record from the opened die means and to process the removed record, said valves being movable to control fluid pressure delivery to the actuators, said other means including solenoids connected with the valves to control said movement thereof, said apparatus being operable in automatic and manual control modes, the combination comprising
   a. first circuit means to control said other means,
   b. second circuit means to control said flow control actuator and valve means in timed relation to said opening and closing of the die means, and connected with said first circuit means to control same,
   c. third circuit means including manually operable switches connected with the solenoids to control solenoid controlled valve movement thereby to control said plastic blank supply, said closing and opening of the die means and said removal and processing of the pressed record, and
   d. mode control switch means to enable one or the other of said first and third circuit means,
   e. there being indicator lights electrically connected with said solenoids to indicate energization thereof,
   f. the second circuit means including a steam flow control and a water flow control, the water flow control being connected to control said first circuit means, said second circuit means including switch means responsive to die means movement to prevent operation of the water flow control if the die means does not completely close, said second circuit means including delay means to delay initiation of water supply to the die means for a predetermined interval after cessation of steam supply to the die means, thereby to effect boosting of heating of the die means.

2. The combinaion of claim 1 including control box structure carrying said first, second and third circuit means, said indicator lights and said mode control switch means.

3. The combination of claim 1 wherein said other means includes means to effect application of a label to the plastic blank prior to supply of the blank to the opened die means, and wherein said means to remove the record from the die means includes a slide, said first circuit means including a slide actuating circuit and switch means responsive to the completion of said label application to complete said slide actuating circuit.

4. The combination of claim 3 wherein said other means includes means to displace a center pin within the die means to centrally penetrate the plastic blank, said first circuit means including a center pin actuating circuit and switch means responsive to movement of the slide to complete said pin actuating circuit.

5. The combination of claim 4 wherein said first circuit means includes photocell and relay means to control completion of the pin actuating circuit, the photocell having a beam located to sense whether or not a previously pressed record has been removed from between the opened die means.

6. The combination of claim 1 wherein said other means includes means to displace a center pin within the die means to centrally penetrate a plastic blank, said means to remove a record from the opened die means includes a record gripper on a slide, and said first circuit means includes switch means responsive to said displacement of the center pin to control opening of the gripper.

7. The combination of claim 1 wherein said first circuit means includes a photocell and relay means to control said means to close the die means, the photocell having a beam located to sense whether or not a plastic blank has been delivered to a zone between the opened die means.

8. The combination of claim 3 wherein said means to effect label application includes a suction cup to retain a label for application to the record blank, a label holder movable into and out of position to feed labels to said cup and a label holder actuator, and said first circuit means includes vacuum switch means responsive to a change of vacuum in a line connected with said suction cup to control operation of said label holder actuator.

9. The combination of claim 8 wherein said first circuit means includes switch means to control energization of the means to process the removed record in response to supply of the labeled blank to the opened die means.

10. The combination of claim 6 wherein said first circuit means includes switch means to control movement of the slide relative to the die means in response to opening of the gripper.

* * * * *